(12) United States Patent
Peters

(10) Patent No.: US 9,417,613 B2
(45) Date of Patent: Aug. 16, 2016

(54) ACTIVATION MODE OF AN ELECTRONIC WATCH

(71) Applicant: ETA SA Manufacture Horlogere Suisse, Grenchen (CH)

(72) Inventor: Jean-Bernard Peters, Pieterlen (CH)

(73) Assignee: ETA SA Manufacture Horlogere Suisse, Grenchen (CH)

(*) Notice: Subject to any disclaimer, the term of this patent is extended or adjusted under 35 U.S.C. 154(b) by 0 days.

(21) Appl. No.: 14/441,422

(22) PCT Filed: Nov. 8, 2013

(86) PCT No.: PCT/EP2013/073385
§ 371 (c)(1),
(2) Date: May 7, 2015

(87) PCT Pub. No.: WO2014/076008
PCT Pub. Date: May 22, 2014

(65) Prior Publication Data
US 2015/0293502 A1 Oct. 15, 2015

(30) Foreign Application Priority Data
Nov. 13, 2012 (EP) .................................. 12192313

(51) Int. Cl.
*G04G 21/00* (2010.01)
*G04G 21/08* (2010.01)
*G06F 3/0489* (2013.01)
*G06F 1/16* (2006.01)

(52) U.S. Cl.
CPC ............... *G04G 21/00* (2013.01); *G04G 21/08* (2013.01); *G06F 1/163* (2013.01); *G06F 3/0489* (2013.01)

(58) Field of Classification Search
CPC ........ G04G 21/00; G04G 21/08; G06F 1/163; G06F 3/0489; G06F 3/0484; G06F 3/0487
USPC .............................................. 368/69, 319–321
See application file for complete search history.

(56) References Cited

U.S. PATENT DOCUMENTS

| 4,120,148 A * | 10/1978 | Moyer ...................... G04G 5/00 368/204 |
| 4,205,519 A | 6/1980 | Deruns |
| 7,187,626 B2 * | 3/2007 | Lizzi ........................ G04F 10/00 368/107 |
| 2002/0064099 A1 | 5/2002 | Wyssbrod et al. |
| 2004/0042347 A1 * | 3/2004 | Born ....................... G04G 21/08 368/69 |
| 2004/0190380 A1 * | 9/2004 | Wojcieszak ............. G04G 9/007 368/69 |
| 2005/0270909 A1 * | 12/2005 | Noirjean ................. G04C 3/001 368/69 |

(Continued)

FOREIGN PATENT DOCUMENTS

GB 1 482 176 A 8/1977

OTHER PUBLICATIONS

International Search Report issued May 19, 2014, in PCT/EP2013/073385, filed Nov. 8, 2013.

*Primary Examiner* — Vit W Miska
(74) *Attorney, Agent, or Firm* — Oblon, McClelland, Maier & Neustadt, L.L.P.

(57) ABSTRACT

A portable object is provided including a case closed by a back cover and by a display, an electronic module arranged inside the case providing at least a first piece of information and a second piece of information, and a controller controlling the electronic module, the portable object being configured to operate in a first operating mode and in a second operating mode.

20 Claims, 1 Drawing Sheet

(56) References Cited

U.S. PATENT DOCUMENTS

| | | | |
|---|---|---|---|
| 2006/0092177 A1 | 5/2006 | Blasko | |
| 2007/0081424 A1* | 4/2007 | Ciervo | G04G 21/00 368/69 |
| 2008/0253234 A1 | 10/2008 | Rogers | |
| 2010/0039904 A1 | 2/2010 | Rogers | |
| 2011/0115784 A1 | 5/2011 | Tartz et al. | |
| 2011/0187660 A1 | 8/2011 | Hirata et al. | |

* cited by examiner

ACTIVATION MODE OF AN ELECTRONIC WATCH

CROSS-REFERENCE TO RELATED APPLICATIONS

This is a National phase application in the United States of International patent application PCT/EP2013/073385 filed Nov. 8, 2013, which claims priority to European patent application No. 12192313.0 filed Nov. 13, 2012. The entire disclosures of the above patent applications are hereby incorporated by reference.

The invention concerns a portable object including a case closed by a back cover and by display means, an electronic module arranged inside said case providing at least a first piece of information and a second piece of information, and control means for controlling said electronic module, said portable object being configured to operate in a first operating mode in which said first piece of information is displayed or in a second operating mode in which said second piece of information is displayed.

BACKGROUND OF THE INVENTION

There are known timepieces 1 including a case 2 formed of a middle part closed by a back cover and by display means 3. Said case is arranged so that an electronic module can be placed therein. This electronic module is configured to provide a certain amount of information sent to the display means. The information provided by the electronic module may be, for example, the time, the date, a chronograph function or other information. This information may come from sensors communicating with said electronic module. In such case, it is necessary to be able to select the desired function.

The timepiece further includes control means for controlling it. These control means may, for example, include capacitive type touch keys 5. These touch keys are arranged on the display means as seen in FIG. 1. Thus, by pressing the touch keys, the user is able to operate the timepiece.

The timepiece is arranged to operate in two operating modes: a "normal" mode in which time information is displayed and a "special" mode in which the user can select other functions.

To activate the special operating mode, the user is currently required to exert pressure on two touch keys at the same time. This manipulation is detected by the electronic module which will then enter the special operating mode and allow the user to select a function.

One drawback of this method is that the user does not necessarily read the instructions and does not instinctively know how to switch between the various operating modes. Likewise, this manipulation is possible if the keys are sufficiently large and spaced apart but if the touch keys are small and close together, the manipulation is difficult. Indeed, the user risks exerting pressure on keys which are not those enabling the switch from one operating mode to another.

SUMMARY OF THE INVENTION

It is an object of the invention to overcome the drawbacks of the prior art by proposing to provide a timepiece whose various operating modes are intuitively and reliably activated.

To this end, the present invention concerns a portable object including a case closed by a back cover and by display means, an electronic module arranged in said case, and control means for controlling said electronic module, said portable object being configured to operate in a first operating mode and in a second operating mode, characterized in that said control means include a plurality of tactile switching elements arranged on opposite sides of the case, two switching elements arranged opposite each other forming a pair of switching elements, and in that at least the switch from the first operating mode to the second operating mode is achieved by simultaneous action on both switching elements of any pair of switching elements.

In a first advantageous embodiment, the switching elements are arranged symmetrically with respect to a 12 o'clock-6 o'clock axis.

In a second advantageous embodiment, said control means include two series of switching elements each including an identical number of switching elements.

In a third advantageous embodiment, each series of switching elements includes three switching elements.

The invention also concerns a method of operating a portable object including a case closed by a back cover and by display means, an electronic module arranged inside said case, and control means for controlling said electronic module, said portable object being configured to operate in a first operating mode and in a second operating mode, characterized in that said control means include at least two tactile switching elements arranged on opposite sides of the case and in that the method further includes at least one step intended to switch from the first operating mode to the second operating mode, achieved by simultaneous action on the at least two switching elements.

In a first advantageous embodiment, the method further includes a step intended to switch from the second operating mode to the first operating mode, this step being achieved by simultaneous action on the at least two switching elements.

In a second advantageous embodiment, the method further includes a step intended to select and then activate a function, the activation of said function being achieved by simultaneous action on the two switching elements.

In a third advantageous embodiment, the at least two switching elements are arranged symmetrically relative to a 12 o'clock-6 o'clock axis.

In another advantageous embodiment, said control means include two series of switching elements each including an identical number of switching elements.

In another advantageous embodiment, each series of switching elements includes three switching elements.

In another advantageous embodiment, at least the switch from the first operating mode to the second operating mode is achieved by successive action on at least two pairs of switching elements, each pair being formed by two switching elements that are symmetrical to each other with respect to a 12 o'clock-6 o'clock axis.

BRIEF DESCRIPTION OF THE DRAWINGS

The objects, advantages and features of the portable object and the method according to the present invention will appear more clearly in the following detailed description of at least one embodiment of the invention, given solely by way of non-limiting example and illustrated by the annexed drawings, in which.

DETAILED DESCRIPTION OF THE INVENTION

Figure 1:
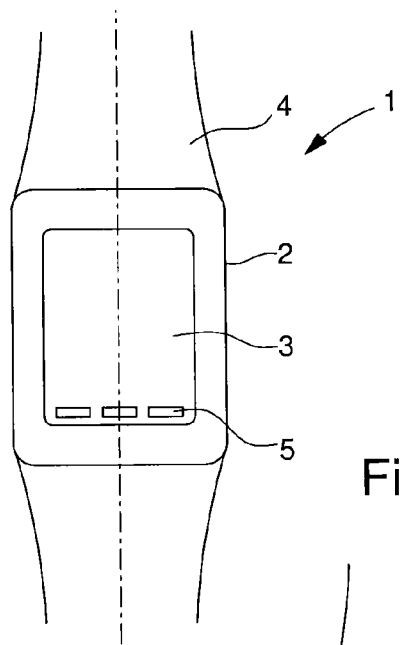
FIG. 1 is a schematic view of a timepiece according to the invention.
Figure 2:
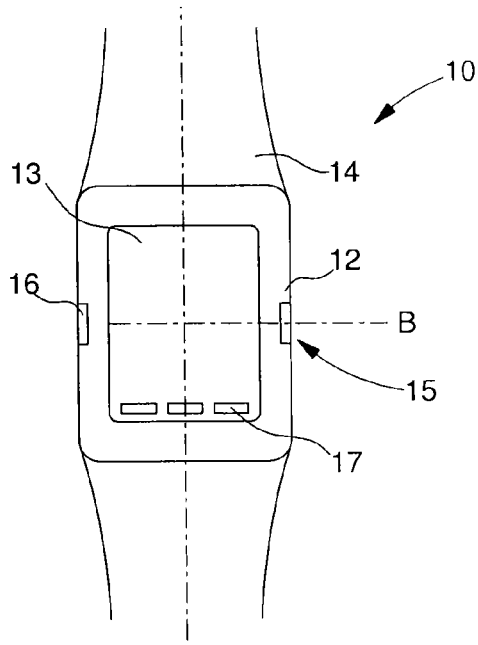
FIG. 2 is a schematic top view of the timepiece according to the invention without the crystal.

FIG. 2 shows a portable object 10 according to the invention. This portable object 10 is, for example, a timepiece. This timepiece includes a case 12 closed by a back cover 12a and by display means 13. Case 12 may be made, for example, of plastic. The portable object further includes a bracelet or wristlet 14 fixed on two opposite sides of case 12. Preferably, bracelet 14 is fixed so that it lies within the extension of the 12 o'clock-6 o'clock axis. Display means 13 are, for example, an LCD module including an LCD screen device arranged on a crystal, all fixed to the middle part of the timepiece.

Figure 4:
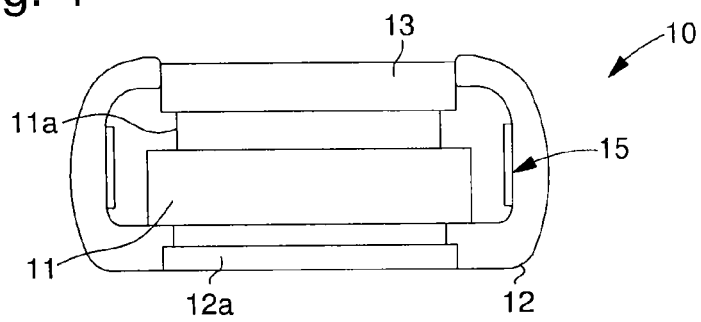
FIG. 4 is a schematic top view of the timepiece crystal once the method of the invention has been performed.

In the timepiece case seen in FIG. 4 is arranged an electronic module 11. This electronic module 11 is electronically connected to display means 13 by connection means 11a. This electronic module 11 is controlled by control means 15. These control means 15 may include a plurality of tactile elements 17 arranged on LCD module 13 so that the user can control the portable object by touch. This electronic module 11 is configured to provide several pieces of information which will be displayed on display module 13. For example, electronic module 11 is configured to provide a multitude of time-related information. It is thus understood that electronic module 11 is capable of providing a first piece of time information such as the time, a second piece of time information such as the date, a third piece of time information such as an alarm, or a fourth piece of information such as a chronograph function.

Consequently, electronic module 11 is configured to operate timepiece 10 in two operating modes.

In a first operating mode, electronic module 11 is used to provide and display the first piece of information which is the time.

In a second operating mode, electronic module 11 gives the user access to other information which it can provide, such as the second piece of information concerning the date, the third piece of time information concerning an alarm or the fourth piece of information concerning a chronograph function.

Electronic module 11 may be arranged so that the other information can be displayed together with the first piece of information, or instead of the first piece of information. It will be understood that the second operating mode may also be an adjustment mode or a programming mode. Likewise, it is possible to envisage that the first operating mode is a standby mode and the second operating mode is an active mode.

To switch from the first operating mode to the second operating mode, a trigger must be activated.

Advantageously according to the invention, control means 15 of portable object 10 further include two switching elements 16 arranged in case 12 of portable object 10. More specifically, these two switching elements 16 are arranged on either side of case 12. These two switching elements 16 are preferably placed opposite each other along an axis parallel to the 3 o'clock-9 o'clock axis. Switching elements 16 are used to provide the trigger which will permit the switch from the first operating mode to the second operating mode. Switching elements 16 are preferably tactile. In that case, case 12 is arranged accordingly and will be made of a material permitting the presence of these tactile switching elements 16.

According to a first embodiment of the invention, the trigger permitting the switch from the first operating mode to the second operating mode is a simultaneous action on both switching elements 16. The user places his thumb and index finger on either side of case 12 of portable object 10 and enters into contact with the two sides of case 12. This simultaneous action is detected by electronic module 11 which will then switch from the first operating mode to the second operating mode.

One advantage of this manipulation is that it is both intuitive and reliable. The manipulation is intuitive because it uses the gesture of pinching case 12 of portable object 10, such as a timepiece 10. This is a natural gesture. Indeed, the use of the chronograph function of a wristwatch 14 uses a similar gesture since the user places his thumb and index finger on either side of case 12 of portable object 10 and presses with the index finger on control member 17 thereby starting or stopping the chronograph function.

This manipulation is considered to be reliable, that is to say that it is difficult to switch inadvertently from the first operating mode to the second operating mode. Indeed, although it is possible to inadvertently press one key, it is considerably more difficult to simultaneously press two opposite keys.

Figure 3:
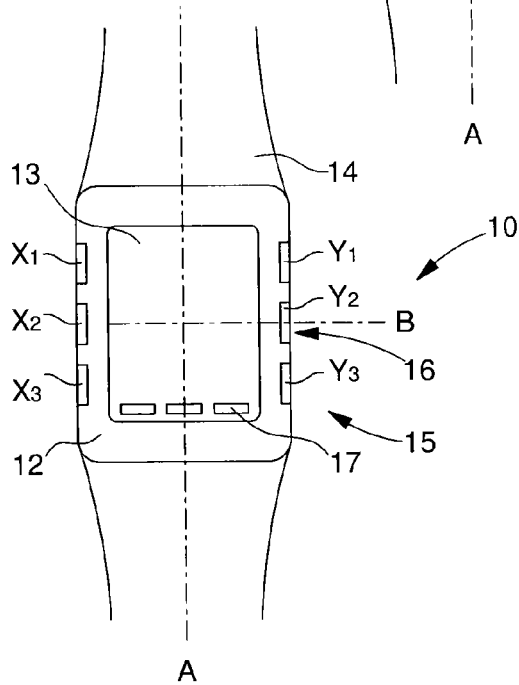
FIG. 3 is a schematic top view of the crystal of the timepiece according to the invention.

In a variant of this embodiment seen in FIG. 3, control means 15 of portable object 10 include two series of switching elements 16 arranged on case 12. More specifically, portable object 10 includes two series of switching elements 16 arranged on opposite sides, the sides of case 12 parallel to the 12 o'clock-6 o'clock axis. Switching elements 16 are arranged to be symmetrical with respect to the 12 o'clock-6 o'clock axis. This configuration makes it possible to multiply the number of possible combinations. Indeed, with this configuration it is possible to envisage each pair of switching elements 16 facing each other being capable of enabling the switch from the first operating mode to the second operating mode. It even becomes possible to envisage both pairs being capable of enabling such a switch.

In an example shown in FIG. 3, each of the two series of switching elements 16 includes 3 switching elements 16, respectively referenced X1, X2, X3 and Y1, Y2, Y2, these switching elements 16 forming pairs. According to the second embodiment, it may be possible for only pair X1, Y1 or X2, Y2 or X3, Y3 to enable the switch from the first operating mode to the second operating mode. This operation has the advantage of improved security, since even if the user pinches case 12 of portable object 10 by mistake, there is only one chance in three of acting on the right pair.

It is also possible to envisage pairs X1, Y1 and X2, Y2 and X3, Y3 being capable of enabling the switch from the first operating mode to the second operating mode. This manipulation has the advantage of permitting the user to switch from the first operating mode to the second operating mode simply by remembering to pinch two switching elements 16 opposite each other. Consequently, he does not need to remember an exact combination since all the combinations work.

In a second embodiment, control means 15 of the portable object include two series of switching elements 16, these series being arranged on opposite sides of case 12, each series including at least two switching elements 16. Switching elements 16 are arranged to be symmetrical with respect to the 12 o'clock-6 o'clock axis, thus forming pairs comprising two opposite switching elements 16. This second embodiment is characterized in that the switch from the first operating mode to the second operating mode is activated by a sliding manipulation. This sliding manipulation consists of the successive activation of pairs of switching elements 16. To explain this manipulation, it will be assumed, as seen in FIG. 3, that each of the two series of switching elements 16 includes 3 switching elements 16, respectively referenced X1, X2, X3 and Y1, Y2, Y3 forming pairs X1-Y1, X2-Y2 et X3-Y3.

This sliding manipulation thus consists in activation by the user of the X1-Y1 pair of switching elements by pressing his fingers and then sliding them to activate in succession the X2-Y2 pair of switching elements, and then the X3-Y3 pair of switching elements. Electronic module 11 thus detects the activation of switching element pairs 16. Electronic module 11 is also programmed so that the switch from the first operating mode to the second operating mode only occurs if all the pairs of switching elements 16 are activated within a predefined time interval. This predefined time interval exists so that the switch from one operating mode to another does not occur if the time elapsed between activation of one pair and another is too great. Defining a time interval during which activation of all of the pairs of switching elements must occur means that the switch from one operating mode to another is reliable and only occurs when actually required.

Likewise, these manipulations of the first embodiment and of the second embodiment may also be used during the switch from the second operating mode to the first operating mode.

It will be clear that various alterations and/or improvements and/or combinations evident to those skilled in the art may be made to the various embodiments of the invention set out above without departing from the scope of the invention defined by the annexed claims.

It will be understood that the switching elements are not necessarily tactile areas and may be push-pieces.

It is also possible to envisage that the manipulations of the first and second operating modes serve to confirm selection. This means that, in a menu in which it is possible to select a function, it is possible for the user to select the desired function and confirm his selection by using the manipulation according to the invention, i.e. by simultaneously activating two capacitive elements arranged on either side of case 12.

The invention claimed is:

1. A portable object comprising:
   a case closed by aback cover and by a display including a display surface, the case including a first pair of opposite faces provided laterally with respect to the display surface and a second pair of opposite faces;
   a bracelet fixed on the second pair of opposite faces;
   an electronic module arranged in the case; and
   a controller to control the electronic module,
   the portable object being configured to operate in a first operating mode and in a second operating mode,
   wherein the controller includes a plurality of pairs of physically discrete tactile switching elements arranged on the first pair of opposite faces such that two switching elements of each pair are arranged opposite each other, and
   wherein at least a switch from the first operating mode to the second operating mode is achieved by simultaneous action on both switching elements of any one pair of switching elements.

2. The portable object according to claim 1, wherein the switching elements are arranged symmetrically with respect to a 12 o'clock-6 o'clock axis.

3. The portable object according to claim 1, wherein the controller includes two series of switching elements each including an identical number of switching elements.

4. The portable object according to claim 2, wherein the controller includes two series of switching elements each including an identical number of switching elements.

5. The portable object according to claim 3, wherein each series of switching elements includes three switching elements.

6. The portable object according to claim 4, wherein each series of switching elements includes three switching elements.

7. A method of operating a portable object including a case closed by a back cover and by a display including a display surface, the case including a pair of opposite faces provided laterally with respect to the display surface, an electronic module arranged inside the case, and a controller to control the electronic module, the portable object being configured to operate in a first operating mode and in a second operating mode,
   wherein the controller includes at least one tactile element provided on the display surface and a plurality of pairs of tactile switching elements arranged on the opposite faces such that two switching elements of each pair are arranged opposite each other,
   wherein the method includes at least one operation to switch from the first operating mode to the second operating mode, achieved by simultaneous action on the at least two switching elements, and
   wherein the switch from the first operating mode to the second operating mode is not achieved by action on the at least one tactile element.

8. The operating method according to claim 7, wherein the method further includes an operation to switch from the second operating mode to the first operating mode, achieved by simultaneous action on the at least two switching elements.

9. The operating method according to claim 7, wherein the method further includes an operation to select and activate a function, activation of the function being achieved by simultaneous action on the two switching elements.

10. The operating method according to claim 9, wherein the at least two switching elements are arranged symmetrically with respect to a 12 o'clock-6 o'clock axis.

11. The operating method according to claim 7, wherein the controller includes two series of switching elements each including an identical number of switching elements.

12. The operating method according to claim 8, wherein the controller includes two series of switching elements each including an identical number of switching elements.

13. The operating method according to claim 9, wherein the controller includes two series of switching elements each including an identical number of switching elements.

14. The operating method according to claim 10, wherein the controller includes two series of switching elements each including an identical number of switching elements.

15. The operating method according to claim 11, wherein each series of switching elements includes three switching elements.

16. The operating method according to claim 12, wherein each series of switching elements includes three switching elements.

17. The operating method according to claim 13, wherein each series of switching elements includes three switching elements.

18. The operating method according to claim 14, wherein each series of switching elements includes three switching elements.

19. The operating method according to claim 9, wherein at least a switch from the first operating mode to the second operating mode is achieved by successive action on at least two pairs of switching elements, each pair being formed by two switching elements that are symmetric each other with respect 12 o'clock-6 o'clock axis.

20. The operating method according to claim 9, wherein the simultaneous action involves sliding fingers along the opposite faces to activate the plurality of pairs of switching elements.

\* \* \* \* \*